(12) United States Patent
Costas

(10) Patent No.: US 8,115,678 B1
(45) Date of Patent: Feb. 14, 2012

(54) GENERATING AN ARRAY CORRELATION MATRIX USING A SINGLE RECEIVER SYSTEM

(75) Inventor: Carlos R. Costas, Brandon, FL (US)

(73) Assignee: Raytheon Company, Waltham, MA (US)

( * ) Notice: Subject to any disclaimer, the term of this patent is extended or adjusted under 35 U.S.C. 154(b) by 274 days.

(21) Appl. No.: 12/497,279

(22) Filed: Jul. 2, 2009

Related U.S. Application Data

(60) Provisional application No. 61/133,902, filed on Jul. 3, 2008.

(51) Int. Cl.
*H01Q 3/00* (2006.01)

(52) U.S. Cl. .......................... 342/372; 342/373; 342/383

(58) Field of Classification Search .................. 342/372, 342/373, 378, 383; 455/67.11, 226.1; 370/335, 370/342
See application file for complete search history.

(56) References Cited

U.S. PATENT DOCUMENTS

| | | | |
|---|---|---|---|
| 6,593,882 B1 | 7/2003 | Kim et al. | |
| 6,597,678 B1 * | 7/2003 | Kuwahara et al. | 370/342 |
| 6,816,118 B2 | 11/2004 | Kingsley et al. | |
| 6,839,573 B1 | 1/2005 | Youssefmir et al. | |
| 6,861,981 B2 | 3/2005 | Park et al. | |
| 7,107,033 B2 | 9/2006 | du Toit | |
| 2002/0018517 A1 * | 2/2002 | Hara | 375/147 |
| 2003/0100344 A1 * | 5/2003 | Garmonev et al. | 455/562 |
| 2006/0194544 A1 * | 8/2006 | Struckman | 455/67.11 |

* cited by examiner

*Primary Examiner* — Dao Phan
(74) *Attorney, Agent, or Firm* — Pierce Atwood LLP; Joseph M. Maraia

(57) ABSTRACT

According to one embodiment, generating an array correlation matrix includes interfacing with an antenna system that has antenna elements. The antenna elements receive incoming signals, and each antenna generates a response signal in response to receiving the signals. The following is performed for a number of iterations to yield summed signals: controlling weights of the antenna elements to weight the response signals; and receiving a summed signal comprising a sum of the weighted signals. An array correlation matrix is generated from the summed signals.

22 Claims, 2 Drawing Sheets

GENERATING AN ARRAY CORRELATION MATRIX USING A SINGLE RECEIVER SYSTEM

RELATED APPLICATION

This application claims benefit under 35 U.S.C. §119(e) of U.S. Provisional Application Ser. No. 61/133,902, entitled "Antenna Array Measurement Technique," filed Jul. 3, 2008, by Carlos R. Costas, which is incorporated herein by reference.

TECHNICAL FIELD

This invention relates generally to the field of antenna systems and more specifically to generating an array correlation matrix using a single receiver system.

BACKGROUND

In certain situations, a communication system may employ a receiver for each antenna element of an antenna array. Using a receiver for each antenna element, however, may yield a heavy, less efficient, and more expensive system.

SUMMARY OF THE DISCLOSURE

In accordance with the present invention, disadvantages and problems associated with previous techniques for generating an array correlation matrix may be reduced or eliminated.

According to one embodiment, generating an array correlation matrix includes interfacing with an antenna system that has antenna elements. The antenna elements receive incoming signals, and each antenna generates a response signal in response to receiving the signals. The following is performed for a number of iterations to yield summed signals: controlling weights of the antenna elements to weight the response signals; and receiving a summed signal comprising a sum of the weighted signals. An array correlation matrix is generated from the summed signals.

Certain embodiments of the invention may provide one or more technical advantages. A technical advantage of one embodiment may be that an array correlation matrix may be calculated by a single receiver system. A single receiver system, for example, a single channel receiver system, may be more economical than other receiver systems.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
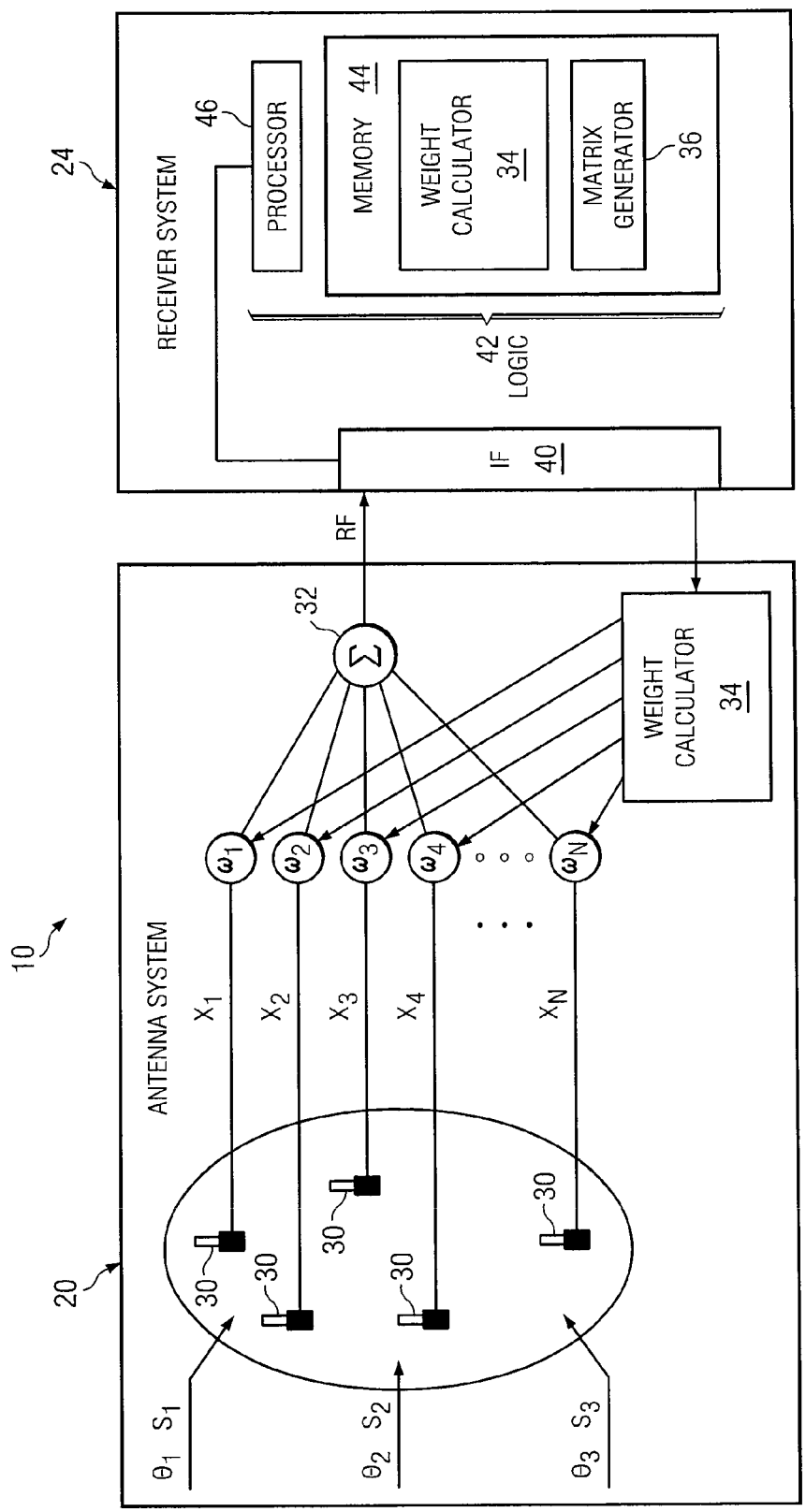
FIG. 1 illustrates one embodiment of a communication system that generates an array correlation matrix from summed signals from a single channel receiver system.
Figure 2:
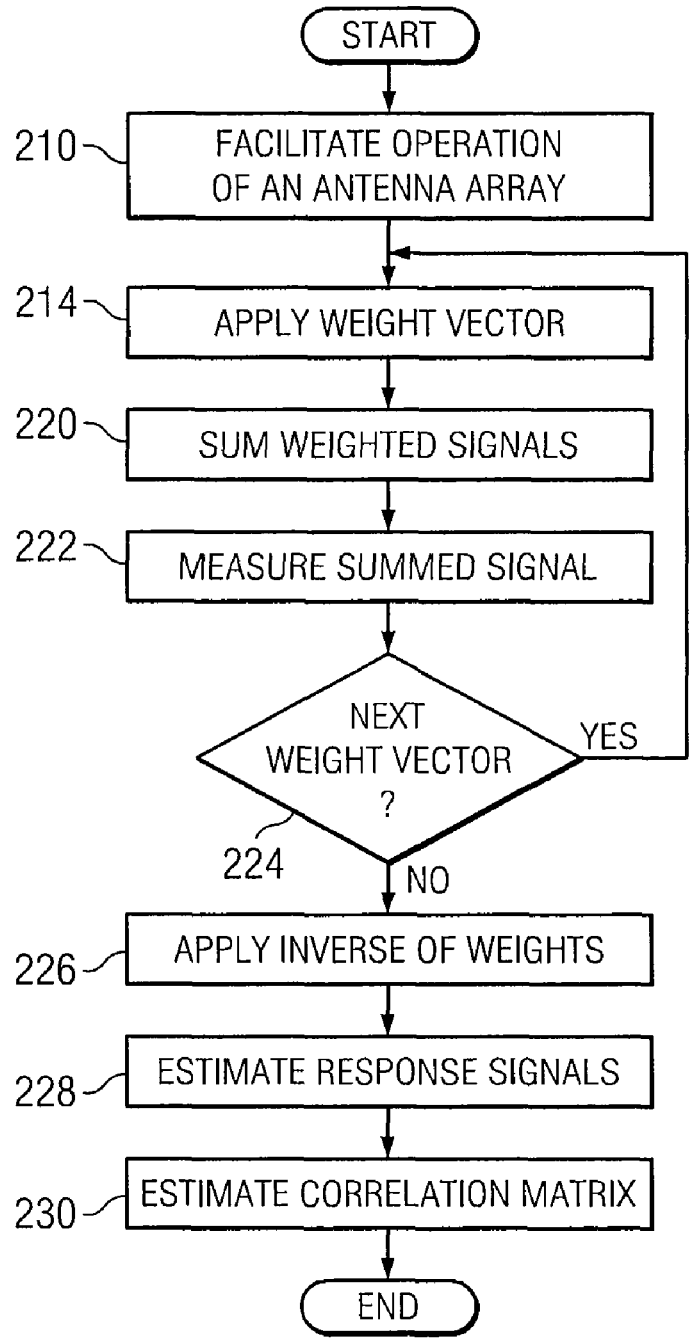
FIG. 2 illustrates an example of a method for generating an array correlation matrix that may be used by the communication system of FIG. 1.

Embodiments of the present invention and its advantages are best understood by referring to FIGS. 1 and 2 of the drawings, like numerals being used for like and corresponding parts of the various drawings.

FIG. 1 illustrates one embodiment of a communication system 10 that generates an array correlation matrix from summed signals from a single channel receiver system. A communication system 10 that has a single channel receiver system, instead of a receiver for each antenna element, may be smaller, lighter, and more economical.

In the illustrated embodiment, communication system 10 may include an antenna system 20 and a receiver system 24. Antenna system 10 may include antenna elements 30 and a signal summation module 32. Receiver system 24 may include an interface (IF) 40, logic 42, and memory 44. Logic 42 may include a processor 46 and a matrix generator 36. A weight calculator 34 may be located at antenna system 20 or receiver system 24.

In one example of operation, communication system 10 generates an array correlation matrix by performing the following to yield summed signals: control weights of antenna elements 30 to weight response signals generated by antenna elements 30, and generate a summed signal comprising a sum of the weighted signals. Matrix generator 36 generates an array correlation matrix from the summed signals. More details are provided herein.

In certain embodiments, antenna system 20 may be a smart antenna system (or an adaptive array antenna). Antenna system 20 may use smart signal processing to identify a spatial signal signature (such as the direction of arrival (DOA)) of a signal, and calculate beamforming vectors from the signature to track and locate the antenna beam on a target. In certain embodiments, antenna system 20 may have an antenna array. Antenna system 20 may have any suitable number of antenna elements 30. For example, antenna system 20 may have less than 5, 5 to 10, 10 to 100, or greater than 100 antenna elements 30. Antenna elements 30 each receive and/or transmit signals, which typically communicate information.

Weight calculator 34 calculates weights applied to the response signals. The weights may be used to yield measurements that can be used to determine individual signals, that is, to separate signals of each antenna element 30 from the signals of other antenna elements 30. For example, the weights may be selected to yield an orthogonal measurement for each antenna element. The weights are described in more detail with reference to FIG. 2. In the example, summation module 32 sums weighted signals to yield a summed signal.

Receiver system 24 receives signals from antenna system 20 and may extract information communicated in the signals. Receiver system 24 may be any suitable system that receives signals, for example, a single channel receiver system. In certain embodiments, receiver system 24 may estimate an array correlation matrix from signals from antenna system 20. The array correlation matrix indicates correlation of antenna elements 30. An example of a method that receiver system 24 may use to estimate the array correlation matrix is described in more detail with reference to FIG. 2.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

FIG. 2 illustrates an example of a method for generating an array correlation matrix that may be used by communication system 10 of FIG. 1. A receiver system 24 facilitates operation of an antenna array of antenna system 20 at step 210. In certain embodiments, antenna system 10 includes antenna elements i=1, . . . , N, where N represents the number of antenna elements 30. An antenna element i generates a response signal $x_i$ in response to an incoming signal $s_i$. Response signal vector $\bar{x}$ may be written as:

$$\bar{x} = \bar{a}(\theta) \cdot \bar{s}(k) + \bar{n}(k)$$

$$= [a(\theta_1)\,a(\theta_2)\,a(\theta_3)\,a(\theta_4)\ldots\,a(\theta_N)] \cdot \begin{bmatrix} s_1(k) \\ s_2(k) \\ s_3(k) \\ \vdots \\ s_D(k) \end{bmatrix} + \bar{n}(k)$$

where $\bar{a}(\theta)$ represents the steering vector for direction $\theta$, $\bar{s}(k)$ represents the incident signal vector, and $\bar{n}(k)$ represents a noise vector.

Steps 214 through 224 describe applying N weight vectors $W_j$ to yield N measured summed signals $y_j$, where j represents a measurement iteration, j=1, . . . , M, from which receiver system 24 can estimate individual response signals $x_i$. In the embodiments, receiver system 24 may instruct weight calculator 34 to apply different weight vectors $W_j$ for any suitable number of iterations, such as M=N iterations.

Receiver system 24 instructs weight calculator 34 to apply weight vector $W_j$ of weights $w_i$ to response signals $x_i$ at step 214. In certain embodiments, a weight vector $W_j$ applied at an iteration j may be expressed as:

$$W_j = \bar{w}[w_1\,w_2\,w_3\,w_4\ldots w_N]^T$$

In certain embodiments, a weight vector $W_j$ may be selected to yield a summed signal that is an orthogonal measurement. In the embodiments, weight vectors $W_j$ may be calculated according to orthogonal codes, for example, Hadamard codes generated using a Hadamard matrix. For example, for N=4, the following weight matrix may be used:

|       | $w_1$ | $w_2$ | $w_3$ | $w_4$ |
|-------|-------|-------|-------|-------|
| $W_1$ | 1     | 1     | 1     | 1     |
| $W_2$ | 1     | −1    | 1     | −1    |
| $W_3$ | 1     | 1     | −1    | −1    |
| $W_3$ | 1     | −1    | −1    | 1     |

In the example, each row represents a weight vector $W_j$ with weights $w_i$ designated by the columns.

Summing module 32 sums the weighted signals at step 220. The summed signals are measured at step 222. The measured summed signals y for sample k may be expressed as:

$$y(k) = \bar{w}^T \cdot \bar{x}(k)$$

There may be a next weight vector $W_j$ to apply at step 224. If there is a next weight vector $W_j$, the method returns to step 214, where receiver system 24 instructs weight calculator 34 to apply the next weight vector W. If there is no next weight vector $W_j$ at step 224, the method proceeds to step 226.

Receiver system 24 estimates an array correlation matrix from the measured signals at steps 226 through 230. The inverse of the weights is applied to measured signals $y_i$ at step 226. For example, the following is the inverse of the above weight matrix:

| .25 | .25  | .25  | .25  |
|-----|------|------|------|
| .25 | −.25 | .25  | −.25 |
| .25 | .25  | −.25 | −.25 |
| .25 | −.25 | −.25 | .25  |

Response signals are estimated at step 228. In certain embodiments, receiver system 24 establishes N equations representing the N signals. The equations may be solved using linear algebra to separate the signals. In certain embodiments, the N equations include N unknowns and are solved to yield values for the unknowns. The unknowns are used to estimate individual response signals. The individual antenna response signals may be expressed as:

$$\bar{x}(k) = (\bar{w}_i^T)^{-1} \cdot y_i(k)$$

Receiver system 24 then estimates an array correlation matrix from estimated response signals $x_i$ at step 230. The array correlation matrix $R_{xx}$ may be estimated in any suitable manner, for example, utilizing standard statistical signal processing such as:

$$R_{xx} = E[\bar{x} \bar{x}^H]$$

where H represents the Hermetian transposed operator. The method then terminates.

Modifications, additions, or omissions may be made to the systems disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   performing the following for a number of iterations corresponding to a number of a plurality of antenna elements to yield a plurality of summed signals, the antenna elements configured to receive a plurality of incoming signals, each antenna element configured to generate a response signal in response to receiving the incoming signals:
   controlling a plurality of weights of the antenna elements to weight the response signals; and
   receiving, at a receiver in communication with the plurality of antenna elements, a summed signal comprising a sum of the weighted signals;
   generating, at the receiver, an array correlation matrix according to the summed signals, the array correlation matrix estimating correlation among the plurality of antenna elements; and
   separating a summed signal into a plurality of individual response signals, the plurality of individual response signals being distinguishable from any signals of any other of the plurality of antenna elements.

2. The method of claim 1, the controlling the plurality of weights further comprising:
   controlling the weights to yield the summed signals from which the individual response signals may be determined.

3. The method of claim 1, the controlling the plurality of weights further comprising:
   initiating application of a plurality of weight vectors to the response signals to yield a plurality of orthogonal measurements, each weight vector yielding an orthogonal measurement.

4. The method of claim 1, the controlling the plurality of weights further comprising:
   initiating application of a plurality of weight vectors to the response signals, each weight vector selected from a row of a Hadamard matrix.

5. A method comprising:
   performing the following for a number of iterations corresponding to a number of a plurality of antenna elements to yield a plurality of summed signals, the antenna elements configured to receive a plurality of incoming signals, each antenna element configured to generate a response signal in response to receiving the incoming signals:
   controlling a plurality of weights of the antenna elements to weight the response signals; and
   receiving a summed signal comprising a sum of the weighted signals; and
   generating an array correlation matrix according to the summed signals, the array correlation matrix estimating correlation among the plurality of antenna elements, wherein the generating the array correlation matrix further comprising:
   establishing a plurality of equations representing the summed signals; and
   solving the equations to estimate the individual response signals.

6. The method of claim 1, the generating the array correlation matrix further comprising:
   applying a plurality of inverse weights to the summed signals to estimate the individual response signals.

7. The method of claim 1, the generating the array correlation matrix further comprising:
   estimating the individual response signals from the summed signals; and
   generating the array correlation matrix from the estimated response signals.

8. A system comprising:
   an interface configured to communicate with an antenna system comprising a plurality of antenna elements, the antenna elements configured to receive a plurality of incoming signals, each antenna element configured to generate a response signal in response to receiving the incoming signals; and
   one or more processors configured to:
   perform the following for a number of iterations corresponding to the number of antenna elements to yield a plurality of summed signals:
   control a plurality of weights of the antenna elements to weight the response signals; and
   receive, at a receiver in communication with the plurality of antenna elements, a summed signal comprising a sum of the weighted signals; and
   generate, at the receiver, an array correlation matrix according to the summed signals, the array correlation matrix estimating correlation among the plurality of antenna elements; and
   separate a summed signal into a plurality of individual response signals, the plurality of individual response signals being distinguishable from any signals of any other of the plurality of antenna elements.

9. The system of claim 8, the one or more processors configured to control the plurality of weights by:
   controlling the weights to yield the summed signals from which the individual response signals may be determined.

10. The system of claim 8, the one or more processors configured to control the plurality of weights by:
    initiating application of a plurality of weight vectors to the response signals to yield a plurality of orthogonal measurements, each weight vector yielding an orthogonal measurement.

11. The system of claim 8, the one or more processors configured to control the plurality of weights by:
    initiating application of a plurality of weight vectors to the response signals, each weight vector selected from a row of a Hadamard matrix.

12. The system of claim 8, the one or more processors configured to generate the array correlation matrix by:
    establishing a plurality of equations representing the summed signals; and
    solving the equations to estimate the individual response signals.

13. The system of claim 8, the one or more processors configured to generate the array correlation matrix by:
    applying a plurality of inverse weights to the summed signals to estimate the individual response signals.

14. The system of claim 8, the one or more processors configured to generate the array correlation matrix by:
    estimating the individual response signals from the summed signals; and
    generating the array correlation matrix from the estimated response signals.

15. One or more computer readable media storing code when executed by one or more processors configured to:
- perform the following for a number of iterations corresponding to a number of a plurality of antenna elements to yield a plurality of summed signals, the antenna elements configured to receive a plurality of incoming signals, each antenna element configured to generate a response signal in response to receiving the incoming signals:
  - control a plurality of weights of the antenna elements to weight the response signals; and
  - receive, at a receiver in communication with the plurality of antenna elements, a summed signal comprising a sum of the weighted signals; and
- generate, at the receiver, an array correlation matrix according to the summed signals, the array correlation matrix estimating correlation among the plurality of antenna elements; and
- separate a summed signal into a plurality of individual response signals, the plurality of individual response signals being distinguishable from any signals of any other of the plurality of antenna elements.

16. The computer readable media of claim 15, the code configured to control the plurality of weights by:
- controlling the weights to yield the summed signals from which the individual response signals may be determined.

17. The computer readable media of claim 15, the code configured to control the plurality of weights by:
- initiating application of a plurality of weight vectors to the response signals to yield a plurality of orthogonal measurements, each weight vector yielding an orthogonal measurement.

18. The computer readable media of claim 15, the code configured to control the plurality of weights by:
- initiating application of a plurality of weight vectors to the response signals, each weight vector selected from a row of a Hadamard matrix.

19. The computer readable media of claim 15, the code configured to generate the array correlation matrix by:
- establishing a plurality of equations representing the summed signals; and
- solving the equations to estimate the individual response signals.

20. The computer readable media of claim 15, the code configured to generate the array correlation matrix by:
- applying a plurality of inverse weights to the summed signals to estimate the individual response signals.

21. The computer readable media of claim 15, the code configured to generate the array correlation matrix by:
- estimating the individual response signals from the summed signals; and
- generating the array correlation matrix from the estimate response signals.

22. The method of claim 1, wherein the generation of the array correlation matrix further comprises:
- establishing a plurality of equations representing the summed signals; and
- solving the equations to estimate the individual response signals.

* * * * *